United States Patent [19]
Gerwe et al.

[11] Patent Number: 5,897,291
[45] Date of Patent: Apr. 27, 1999

[54] APPARATUS AND METHOD FOR FORMING ARRAYS OF ARTICLES FOR PACKAGING

[75] Inventors: Thomas K. Gerwe; Gregory J. Erickson, both of Cincinnati, Ohio

[73] Assignee: The Procter & Gamble Company, Cincinnati, Ohio

[21] Appl. No.: 08/946,285

[22] Filed: Oct. 7, 1997

[51] Int. Cl.⁶ .......................... B65G 57/00; B65G 47/24; B65G 47/30

[52] U.S. Cl. .................. 414/790.7; 198/374; 198/418.4; 414/798.4; 414/798.6

[58] Field of Search ............................ 414/788.3, 788.5, 414/789.9, 790, 790.1, 790.3, 791.3, 794.1, 798.4, 798.6, 798.7, 788, 790.7, 791.06; 198/374, 418.4, 429, 430

[56] References Cited

U.S. PATENT DOCUMENTS

| | | |
|---|---|---|
| 3,552,736 | 1/1971 | Frick et al. . |
| 3,685,818 | 8/1972 | Burger et al. . |
| 3,822,528 | 7/1974 | Carlsson et al. . |
| 3,954,165 | 5/1976 | Snyder . |
| 3,961,697 | 6/1976 | Hartman et al. . |
| 4,018,432 | 4/1977 | Frick . |
| 4,022,456 | 5/1977 | Hooper et al. . |
| 4,074,508 | 2/1978 | Reid . |
| 4,106,260 | 8/1978 | King . |
| 4,141,193 | 2/1979 | Joa . |
| 4,209,960 | 7/1980 | Deutschländer et al. . |
| 4,307,800 | 12/1981 | Joa . |
| 4,325,475 | 4/1982 | Spalding . |
| 4,370,844 | 2/1983 | Degn et al. . |
| 4,374,559 | 2/1983 | Morton . |
| 4,394,898 | 7/1983 | Campbell . |
| 4,399,905 | 8/1983 | Lance et al. . |
| 4,650,173 | 3/1987 | Johnson et al. . |
| 4,717,375 | 1/1988 | Lundmark . |
| 4,731,977 | 3/1988 | Maekawa . |
| 4,771,589 | 9/1988 | Mueller et al. . |
| 4,776,148 | 10/1988 | Mingozzi . |
| 5,018,334 | 5/1991 | Guttinger et al. . |
| 5,074,096 | 12/1991 | Focke . |
| 5,081,823 | 1/1992 | van der Ent . |
| 5,174,089 | 12/1992 | Poloni . |
| 5,212,929 | 5/1993 | Castellan . |
| 5,218,813 | 6/1993 | Seidel . |
| 5,255,584 | 10/1993 | Fakler . |
| 5,280,694 | 1/1994 | Malow . |
| 5,295,939 | 3/1994 | Ferrari et al. . |
| 5,465,824 | 11/1995 | Van Maanen . |
| 5,474,168 | 12/1995 | Leslie et al. . |

*Primary Examiner*—Joseph E. Valenza
*Assistant Examiner*—K W Bower
*Attorney, Agent, or Firm*—Dinsmore & Shohl LLP

[57] ABSTRACT

A method of forming arrays of articles, comprising: (a) providing a stacker having a plurality of compartments for receiving the articles, the stacker traveling along a closed loop path; (b) transporting a plurality of the articles along a first path to the stacker in sequential fashion; (c) introducing the articles into the compartments at an inlet position; (d) removing a first array of the articles from the stacker at a first stripping position by urging the articles from the compartment in a first stripping direction; (e) transporting the first array along a second path away from the stacker in a direction substantially opposite to the first stripping direction; and (f) repeating steps (b) through (e) for subsequent articles. An apparatus for use in this method is also provided.

20 Claims, 3 Drawing Sheets

APPARATUS AND METHOD FOR FORMING ARRAYS OF ARTICLES FOR PACKAGING

BACKGROUND OF THE INVENTION

1. Field of the Invention

The present invention relates to an apparatus and method for forming arrays of articles for subsequent packaging. More particularly, the present invention provides an array forming apparatus and method wherein each array exiting the apparatus can be in one of two orientations (e.g., nose forward or tail forward).

2. Description of Related Art

Many consumer products or other articles are not of a uniform or symmetrical shape, and thus the packaging of these items can be problematic. If these products are not packaged in an optimal manner, package strength and integrity may suffer and an excessive amount of packaging material may be needed to compensate for such shortcomings. In addition, the resulting package may not be consumer-friendly. It is also usually desirable to load as many articles as possible into a package of a given size in order to minimize slack space. When the articles are not uniform in size, optimal packaging often requires that the articles be packaged in a non-uniform manner. Non-uniform packaging, however, is difficult to accomplish in an automated, mechanical production/packaging process.

One particular type of asymmetrical articles having unique packaging difficulties are diapers, adult incontinence pads, sanitary napkins and pantiliners. These products are often profiled, particularly diapers and adult incontinence pads, such that the crotch portion of the products is much thicker than the waist area due to the additional absorbent material placed near the likely areas of discharge. This difference in thickness is even more pronounced when diapers or incontinence pads are packaged, since each diaper or pad is typically folded in half prior to insertion into an outer package. In addition, the diapers or pads are usually compressed prior to insertion into the package, and differences in compressibility caused by the profiling of these products may create additional packaging difficulties.

Diapers, adult incontinence pads, and similar articles typically are produced in sequential fashion such that the articles leave the production area one after another along a conveyor system. In the case of diapers and adult incontinence pads, these products typically leave the production area lying flat on a moving transport device such as a conveyor belt. The diapers or pads are then folded in half, and then rotated to an upright orientation. In this upright orientation, the diapers or pads are transported serially with the folded nose portion (referred to herein as the proximal end) leading. The diapers or pads are then deposited into an array forming apparatus which compiles a predetermined number of diapers or pads into an array (or stack) for packaging purposes. This array forming apparatus, often referred to as a stacker or accumulator, converts a series of products advancing sequentially along a conveyor system into an array (or stack) comprising a plurality of the diapers or pads positioned side by side. The product array may then be advanced onward to further packaging steps. Exemplary stacking devices are shown in U.S. Pat. Nos. 3,954,165, 4,325,475 and 5,474,168.

Depending on the orientation of the array leaving the stacker, it may be necessary to rotate the array of diapers or pads prior to packaging. Stack rotation is typically accomplished using a stack turning device, such as a turning drum. Such devices, however, are costly, add an additional step to the packaging process, and consume valuable floor space in the manufacturing facility.

The present invention eliminates the need for array turning devices, and allows arrays of articles to be transported directly to packaging equipment in nose forward (i.e., proximal end forward) and/or tail forward (i.e., distal end forward) orientations without interruption.

SUMMARY OF THE INVENTION

It is an object of the present invention to provide an apparatus and method for forming arrays of articles for subsequent packaging, wherein the arrays may be presented transported to the packaging equipment in proximal or distal end forward orientation.

It is another object of the present invention to provide an apparatus and method for forming arrays of articles for subsequent packaging, wherein the arrays may be presented transported to the packaging equipment in proximal or distal end forward orientation, without the use of turning drums or other array turning apparatus.

The foregoing objects can be accomplished, in accordance with one aspect of the present invention by providing a method of forming arrays of articles. This method comprises the steps of:

(a) providing a stacker having a plurality of compartments for receiving the articles, the stacker traveling along a closed loop path;

(b) transporting a plurality of the articles along a first path to the stacker in sequential fashion;

(c) introducing the articles into the compartments at an inlet position;

(d) removing a first array of the articles from the stacker at a first stripping position by urging the articles from the compartment in a first stripping direction;

(e) transporting the first array along a second path away from the stacker in a direction substantially opposite to the first stripping direction; and (f) repeating steps (b) through (e) for subsequent articles.

The stacker may comprise, for example, a closed loop chain having a plurality of fingers extending radially outward from the chain, and a plurality of sprockets upon which the chain travels by rotation of the sprockets. The compartments into which the articles are introduced comprise the region between adjacent fingers, and may also be optionally bounded by a planar support surface above which the stacker rotates.

Arrays are urged from the stacker onto an array support (e.g., a discharge platform) by means of a stripper bar, and each array is then preferably moved to a plane different than the plane of travel of the stacker. Thereafter the arrays may be removed from the array support and transported along a second path away from the stacker in a direction substantially opposite to the first stripping direction. Since the stripping direction is opposite to the direction of transport away from the stripper, the articles will remain in the same orientation as when they were first deposited into the compartments of the stacker. For example, the nose portion (or proximal end) of the articles may be leading as the articles are presented to the stacker, and the arrays of articles leaving the stacker will have this same proximal end forward orientation.

In order to provide arrays of articles which have alternating orientations, the method of the present invention also comprises:

(a) removing a second array of the articles from the stacker at a second stripping location by urging the articles from the compartments in a second stripping direction;

(b) moving the second array of articles to a plane different than the plane of rotation of the compartments;

(c) transporting the second array along the second path away from the stacker in the same direction as the second stripping direction, wherein the articles of the second array are transported along the second path in an orientation which is substantially opposite to the first orientation of the first array; and (d) repeating steps a through (c) for subsequent articles. Preferably, the result is that first and second arrays are transported along the second path in alternating fashion, thereby providing a stream of arrays of the articles having alternating orientations to subsequent packaging operations.

The step of urging the articles from the compartments of the stacker comprises pushing the articles outwardly away from the compartments and away from the interior of the closed loop path around which the stacker travels, onto an array support. In other words, a stripper is typically positioned within the interior of the closed loop, and moves outwardly away from the interior of the closed loop so as to urge articles away from the stacker. The articles may comprise, for example, diapers, incontinence pads, sanitary napkins and pantiliners.

An apparatus for use in the above-described methods is also provided, and comprises:

(a) a continuous stacker having a plurality of compartments for receiving the articles, the stacker advanceable along a closed looped path;

(b) a first conveyor for transporting a plurality of the articles along a first path into the compartments;

(c) a first array support;

(d) a first stripper configured for urging an array of articles from the compartments in a first stripping direction onto the array support; and (e) a second conveyor for transporting an array of articles from the array support in a transport direction which is substantially opposite to the first stripping direction.

A second array support and a second stripper configured for urging an array of articles from the compartments in a second stripping direction onto the second array support, wherein the second stripping direction substantially corresponds to the transport direction may also be provided. The array supports (also referred to herein as discharge platforms) should be moveable between the plane of travel of the stacker towards the plane of travel of the second conveyor in order to facilitate removal of the arrays by the second conveyor.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DESCRIPTION OF THE PREFERRED EMBODIMENTS

While the present invention is particularly suited for forming arrays of diapers, adult incontinence pads, sanitary napkins and pantiliners prior to packaging, the apparatus and methods of the present invention can be employed for any of a variety of articles. Thus, it is not intended that the scope of the present invention be limited to apparatus and methods for these products only. The detailed description of the preferred embodiments, however, will be described using diapers as an exemplary article for purposes of clarity.

Figure 1:
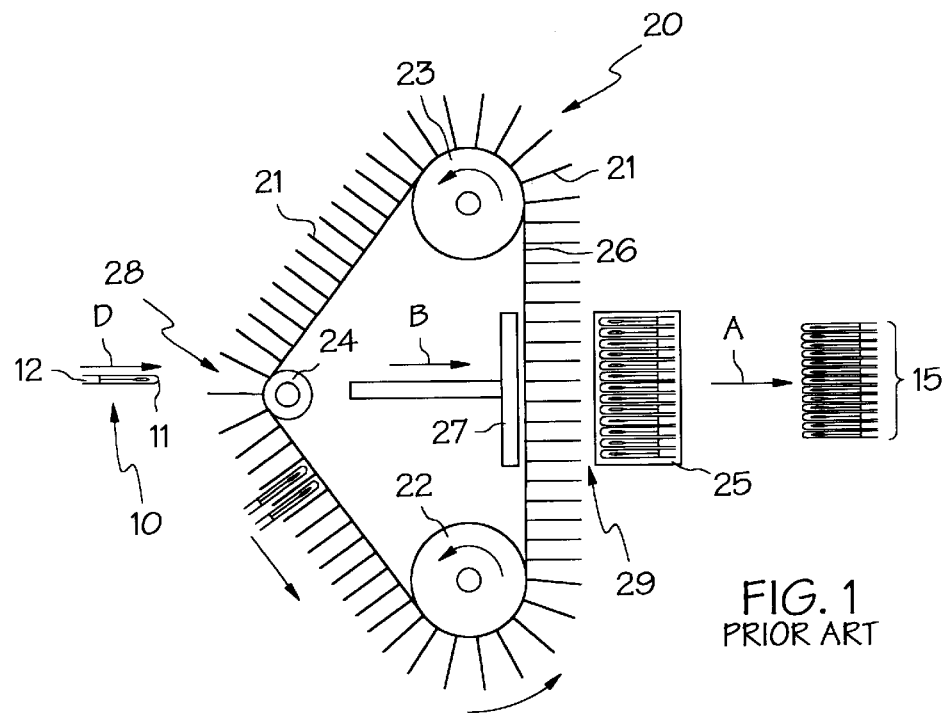
FIG. 1 is a top plan, schematic illustration of a prior art array forming apparatus.
Figure 5:
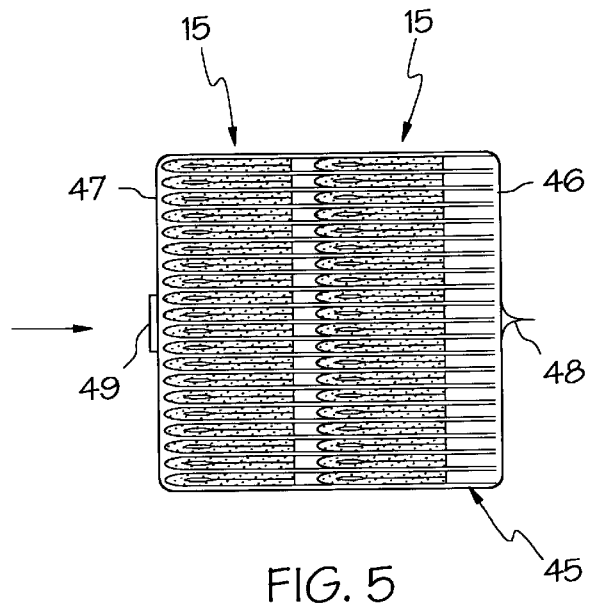
FIG. 5 is a side plan view of a bag of diapers comprising two arrays of diapers formed with the apparatus of FIG. 3.

FIG. 1 is a top plan, schematic view of a prior art apparatus and method for forming arrays of articles (such as diapers) for subsequent packaging. As shown in FIG. 1, diaper 10 has been folded in half and rotated to an upright position as shown. In this manner, diaper 10 has a proximal or nose portion 11 and a distal or tail portion 12. Diaper 10 is transported toward the apparatus of the present invention in the direction of arrow D, and a plurality of individual diapers sequentially follow diaper 10 in the same manner. The diapers may be transported from the manufacturing area to the apparatus of the present invention by any of a variety of devices known to those skilled in the art, such as conveyor belts and the like. One such feed device is shown in FIG. 5 of U.S. Pat. No. 4,325,475.

An array forming apparatus 20, also commonly referred to as a stacker or accumulator, is provided. Stacker 20 comprises a plurality of fingers (or paddles) 21 which are secured to a rotating chain 26. Chain 26 extends around a plurality of rotating sprockets 22, 23 and 24. One or more of these sprockets are driven by a motor, typically a servo motor in order to provide precise control of the array forming apparatus. Fingers 21 may be positioned atop or immediately adjacent to a planar support surface (not shown), and the entire stacker 20 (including fingers 21 and chain 26) travel in a closed-loop fashion.

The region between each of fingers 21 in the apparatus of FIG. 1 defines a compartment 28 into which diaper 10 may be fed. Each compartment 28 is therefore defined by the sidewalls of adjacent fingers 21, and the planar surface over which fingers 21 travel. It should be noted that while stacker 20 is shown as rotating in a horizontal plane, stackers rotating in a vertical plane may also be employed. In this latter embodiment a horizontal planar support surface is not needed, and therefore compartments 28 are defined only as the region between adjacent fingers 21. Diaper 10 may be deposited into compartment 28 by means of a conveyor belt or other transport device (not shown) which is advancing diaper 10 in the direction of arrow D. Preferably, diapers are fed into compartments 28 adjacent the point where chain 26 rotates about feed sprocket 24 (the inlet position). As shown in FIG. 1, when chain 26 rotates about sprocket 24, fingers 21 will spread outwardly away from each other, thereby opening compartment 28 such that diaper 10 may be more easily deposited therein. As will be understood, the spreading of fingers 21 as chain 26 rotates about sprocket 24 is enhanced as sprocket 24 is decreased in diameter.

Once a diaper has been deposited into a compartment 28 between adjacent fingers 21 at an inlet position, the thus deposited diaper will travel within this compartment as the chain and fingers are advanced. Subsequent diapers are deposited into the compartments formed between adjacent fingers in a similar manner, such that a plurality of diapers are deposited into the compartments in successive fashion. As these diapers travel around sprocket 22, the plurality of diapers positioned between adjacent fingers 21 will reach stripping position 29. Here a movable stripper bar 27 will extend in the direction of arrow D thereby urging the diapers from between adjacent fingers onto discharge platform or array support 25. Since the nose portion of each diaper extends above the height of fingers 21, stripper bar 27 is positioned slightly above the height of fingers 21 so as to strip the diapers from compartments 28 as stripper bar 27 is urged in the direction of arrow B. In this manner, an array of diapers 15 is formed. Array 15 is then transported away from stacker 20 in the direction indicated by arrow A towards subsequent packaging steps. It should be noted that since the drawings herein are merely schematic in nature, the spacing between adjacent fingers 21 has been increased for purposes of clarity. In the actual device, the number of compartments 28 which stripper bar 27 spans will obviously correspond to the number of diapers comprising each array 15.

As shown in FIG., 1, stripper bar 27 is positioned within the interior of the closed loop path traveled by stacker 20. The phrase "interior of the closed loop path" refers to the interior of this loop when viewed from above (as shown in FIG. 1), and it is not meant to imply that stripper bar 27 is located precisely in the plane of travel of stripper 20. In fact, as discussed below, stripper 27 is positioned slightly above the plane of travel so that stripper bar 27 can urge diapers out of compartments 28.

As shown in FIG. 1, stripping direction B generally corresponds to direction A in which array 15 of diapers is transported away from stacker 20. As will be apparent, however, the orientation of the diapers of array 15 is now opposite (by 180°) to the orientation of the individual diapers which entered stacker 20, as the nose section of each diaper is no longer leading. During packaging, array 15 is essentially urged into the open end of a polymeric bag or other container and the open end of the bag is then sealed. Since the tail section of each diaper is leading in the prior art apparatus and method of FIG. 1, however, the diapers will be deposited into the bag tails first. The open end which is sealed during the packaging process generally comprises the bottom of the bag, and is opposite the end which is normally opened by the consumer. Thus, when the consumer opens the bag of diapers, the tail portions of each diaper will be on top. Consumers, however, prefer that the nose section (or fold) of the diaper reside at the top to enable easy identification and removal of a discreet diaper by the consumer. In order to accomplish this orientation, it is usually necessary to subject each array to a rotation operation employing complex turning drums or other rotational devices. Such devices, however, are complex and take up additional floor space within the manufacturing facility.

Figure 2:
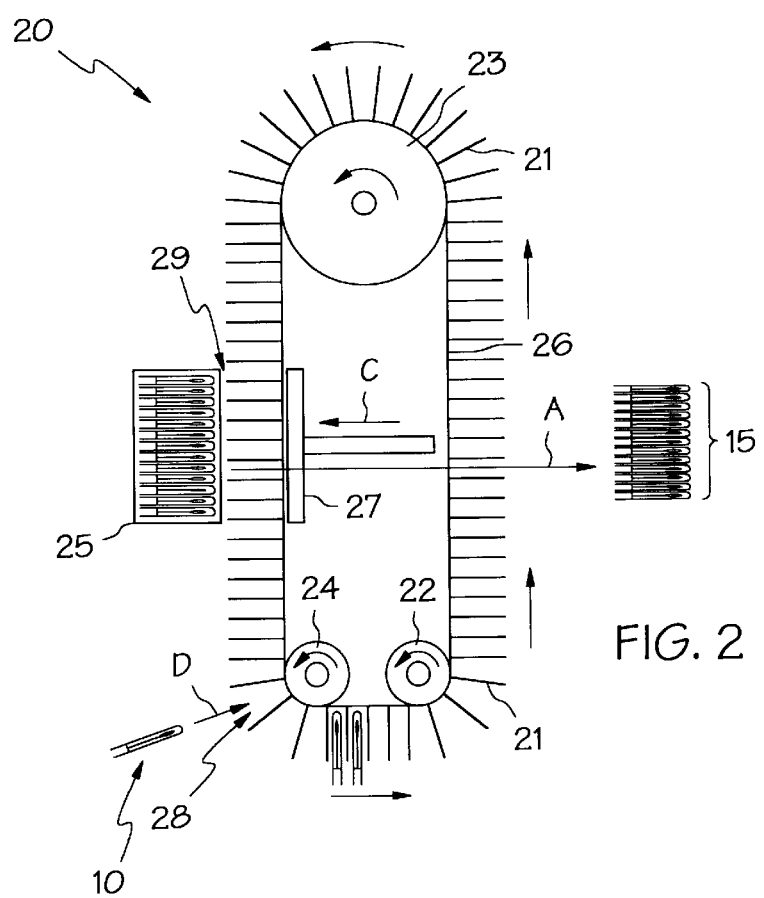
FIG. 2 is a top plan, schematic illustration of one embodiment the array forming apparatus of the present invention.

FIG. 2 depicts one embodiment of the array forming apparatus and method of the present invention, and once again employs a stacker 20 which comprises a plurality of fingers 21 secured to chain or belt 26 which is revolving about a plurality of sprockets or drums 22, 23 and 24. Diapers 10 are introduced into compartments 28 formed by the region between adjacent fingers 21 at an inlet position (adjacent sprocket 24 in FIG. 2), and are then transported sequentially about the stacker within these compartments. An array 15 of the diapers are then removed from stacker 20 at stripping position 29 by means of stripper bar 27 in the manner described above. When viewed from above, stripper bar 27 is positioned within the interior of the closed loop defined by chain 26, and is moved outwardly in the direction of arrow C. Stripper bar 27 thus pushes an array 15 of diapers 10 out of the compartments, and on to discharge platform 25. Array 15 of diapers 10 is then transported in the direction of arrow A away from stacker 20 to subsequent packaging operations. Transport of array 15 away from stacker 20 may be accomplished by the manner described below in conjunction with FIG. 4, or any of a variety or other means known to those skilled in the art.

As will be apparent, array 15 of diapers 10 in FIG. 2 differs from that of FIG. 1 in that the diapers are transported away from the stripper in a nose forward orientation. This is a result of the fact that stripping direction C is 180° opposite to array transport direction A. In the prior art apparatus and methods, the diapers are stripped in the same direction as the prevailing product flow direction, as shown in FIG. 1. By stripping in the opposite direction, the present invention eliminates the need for complex and costly array turning devices, since the array of diapers are transported to the packaging apparatus in a nose leading orientation. In addition, such array turning devices can also damage the diapers during the turning process.

Figure 3:
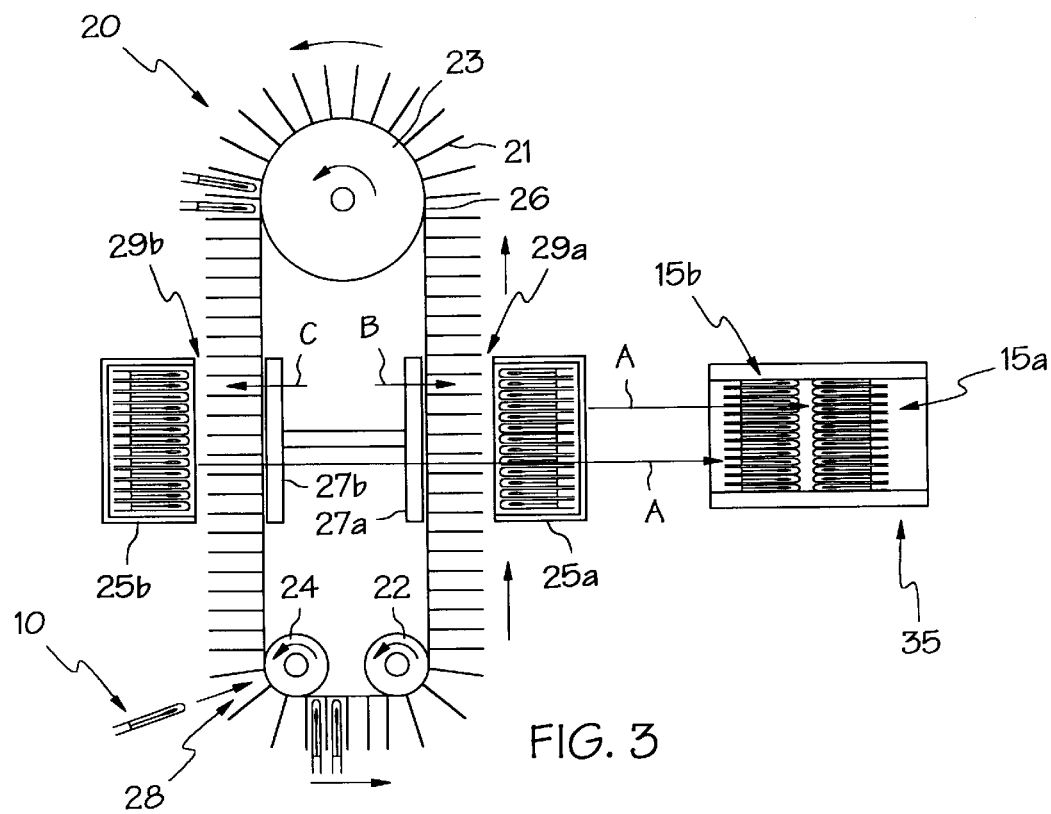
FIG. 3 is a top plan, schematic illustration of another embodiment of the array forming apparatus of the present invention.
Figure 4:
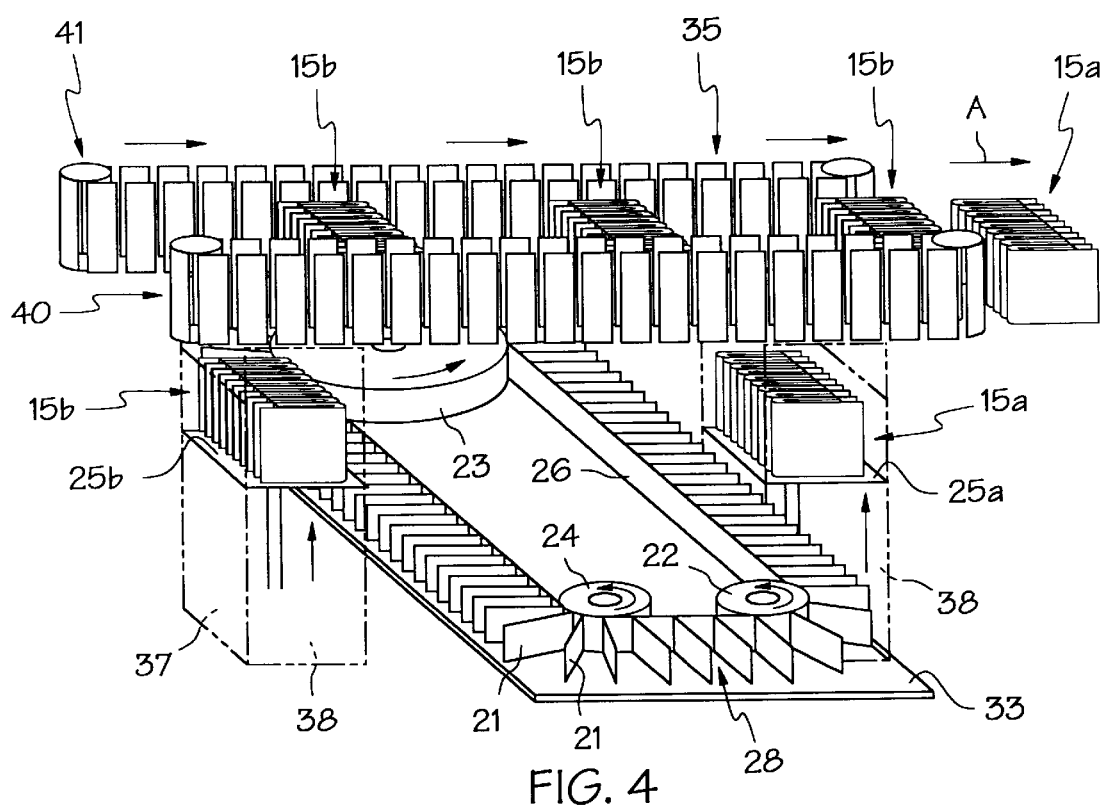
FIG. 4 is a perspective schematic view of the apparatus of FIG. 3.

FIG. 3 and 4 depict an alternative embodiment of the present invention which employs a similar stacker 20 comprising a plurality of fingers 21 rotating in closed loop fashion by means of chain 26. In these figures, the diaper feed mechanism is not shown for purposes of clarity, as such devices are well-known to those skilled in the art. In addition, the individual links of chain 26 as well as the corresponding individual teeth of sprockets 22, 23 and 24, have also been eliminated for purposes of clarity. It should be noted, however, that chain 26 can alternatively comprise a belt or other rotatable closed loop device to which fingers 21 may be secured. Where a belt replaces chain 26, for example, the individual sprockets may comprise rotating drums about which the belt is tensioned. Fingers 21 are also depicted in merely one exemplary embodiment, and can comprise any of a number of configurations. The only requirement for fingers 21 that they be configured such that a compartment 28 is provided between adjacent fingers. Each compartment 28 is bounded on either side by fingers 21, and at its base by planar surface 33 upon which fingers 21 travel. Alternatively, fingers 21 may be replaced by individual cassettes or various other types of compartments which may be advanced in a closed loop, preferably planar fashion by a chain, belt or other driving mechanism.

In the embodiment of FIGS. 3 and 4, a pair of movable stripper bars 27a and 27b are provided. A pair of corresponding discharge platforms 25a and 25b are also provided adjacent the respective stripper bars as shown. Once again, diapers are sequentially deposited into compartments 28 which comprise the space between adjacent fingers 21. For example, as is well-known in the art, the diapers may be introduced into compartments 28 by means of a pair of facing, parallel conveyor belts between which the diapers travel. The conveyor belts transport the diapers to the stacker in successive fashion, and eject each diaper into its own compartment 28 in a nose-first manner. The thus deposited diapers then travel with fingers 21 and chain 26 to first stripping position 29a in the same manner as in FIGS. 1 and 2. As the diapers move through stripping position 29a, first stripper bar 27a selectively urges a first array 15a from stacker 20 in a first stripping direction B. First array 15a is thus deposited onto first discharge platform 25a in the manner previously described.

First stripper bar 27a is selectively operated such that only a portion of the diapers are removed from their respective compartments, and the remainder continue to travel within compartments 28 beyond first stripping position 29a. These diapers will travel with fingers 21 and chain 26 about sprocket 23, until they reach second stripping position 29b. At second stripping position 29b, second stripper bar 27b urges a second array of diapers 15b from stacker 20 in a second stripping direction C. The diapers of second array 15b are thus deposited onto second discharge platform 25b as shown.

In order to transport arrays of diapers away from stacker 20, it is necessary to move the arrays out of the plane of stacker 20. Thus, discharge platforms 25a and 25b can be moved upwardly away from planar surface 33 as shown. In addition, the discharge platforms are each enclosed in a discharge frame comprising a rear wall 37 and a pair of sidewalls 38. Rear wall 37 acts as a backstop against which the diapers are urged by stripper bars 27, thereby ensuring that the diaper arrays are properly deposited onto the discharge platforms. Side walls 38 and rear wall 37 also act in conjunction with one another to maintain the array of diapers 15 on discharge platform 25 as the platform is moved upwardly. In this manner, none of the diapers of array 15 will be dislodged during movement.

In order to transfer arrays of diapers to subsequent packaging steps, a shared transport device 35 is provided above the plane of stacker 20. Alternatively, shared transport device 35 can be provided in a plane below stacker 20, and the discharge platforms moved downwardly to present diaper arrays to the transport device. In the embodiment shown, shared transport device 35 comprises a pair of slat conveyors 40 and 41 positioned substantially parallel to one another and traveling in the same direction. Discharge platforms 25a and 25b having an array of diapers 15a and 15b respectively, positioned thereon, are lifted upwardly until the arrays are gripped by slat conveyors 40 and 41 on either side of the array. Such techniques are well-known to those skilled in the art, and will not be described in great detail herein. Each slat conveyor 40 and 41 should provide a piloting action as the conveyors are advanced in the direction shown, in order to facilitate array removal from the platforms This piloting action can be provided, for example, by tapering the outer surface of the slats such that the distance between a pair of facing slats of conveyors 40 and 41 is its greatest at the bottom portion of each conveyor (i.e., that portion nearest to stacker 20), and its least at the top portion of each slat conveyor. In this manner, discharge platforms 25a and 25b will direct each array of diapers upwardly into the region between slot conveyors 40 and 41, and the tapered nature of the distance between facing slats will act to further direct each array upwardly so as to be positioned between slat conveyors 40 and 41 for travel therewith.

Both first and second arrays 15a and 15b are deposited into the same shared transport device 35, preferably in an alternating arrangement as shown. Thus, second arrays 15b of diapers 10 are transported along shared transport device 35 in spaced relationship to one another as shown in FIG. 4. First arrays 15a of diapers 10 are then deposited into shared transport device 35 between adjacent second arrays 15b. In this fashion, a plurality of arrays of diapers can be transported to packaging operations in an alternating fashion. In other words, the arrays of diapers alternate between nose leading and nose trailing orientations. Of course shared transport device 35 is only one exemplary conveyor for transporting arrays of diapers away from the discharge platform, and any of variety of conveyors well known to those skilled in the art may be employed for this purpose.

The apparatus of FIG. 4 can also be used to provide the traditional nose trailing orientation for arrays of diapers transported to the packaging operations merely by discharging all of the diapers at first stripping position 29a using first discharge platform 25a. Alternatively, the method of FIG. 2 can be accomplished using the apparatus of FIG. 4 merely by ensuring that all diapers are removed from stacker 20 at second stripping position 29b. In this manner, each array of diapers will be provided to the packaging operations in a nose leading orientation. Any of a variety of combinations of these approaches can be used, thereby providing infinite variability in whether a particular array is presented to the packaging operations in a nose leading or nose trailing orientation.

Figure 6:
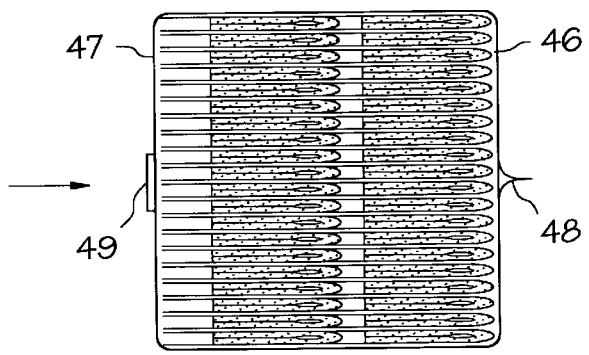
FIG. 6 is a side plan view of another embodiment of a bag of diapers comprising two arrays of diapers formed with the apparatus of FIG. 3.
Figure 7:
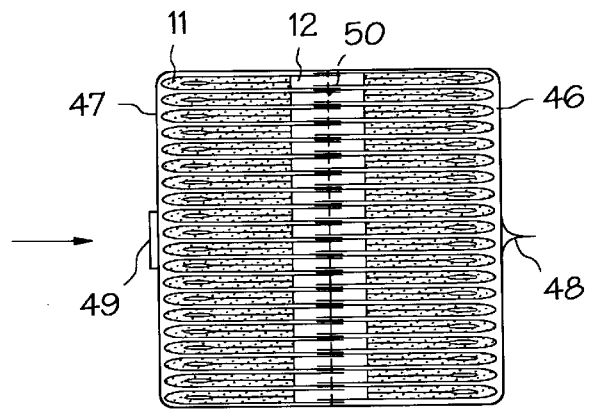
FIG. 7 is a side plan view of yet another embodiment of a bag of diapers comprising two arrays of diapers formed with the apparatus of FIG. 3.

Diapers and adult incontinence pads are often provided to consumers with either single or multiple arrays in each package. FIGS. 5, 6 and 7 depict three alternative packaging configurations which are possible with the apparatus and methods of the present invention. In all of these package configurations, the outer package comprises a flexible, polymeric bag 45 having a top portion 46 and a bottom portion 47 as indicated. During packaging, top portion 46 remains closed during insertion of the diaper arrays. A releasable closure 48 is typically provided, and can be of any of a variety of configurations, including a perforated tear-away strip, a releasably-sealed strip, or other suitable means well-known to those skilled in the art. Bottom portion 47, on the other hand, remains open during the packaging step, since arrays 15 of the diapers are inserted through open bottom portion 47. After the diaper arrays have been inserted there through, bottom portion 47 is sealed by means of a sealing strip 49, or other means well-known to those skilled in the art.

In the diaper package of FIG. 5, two arrays of diapers 15 have been inserted into the package in a tail leading (or nose trailing) orientation. This package form can, for example, be the result of employing the prior art apparatus and method of FIG. 1 without employing a turning device prior to packaging. The package configuration of FIG. 4 may be undesirable, however, since when closure 48 is opened by the consumer, only the tail portion of each diaper will be assessable. When the apparatus and method of the present invention as shown in FIG. 2 is used, the diapers can be presented to the bag in a nose leading orientation, and therefore the package of diapers thus produced will have the orientation shown in FIG. 6. When the package of FIG. 6 is opened by means of releasable closure 48, the nose-portion of each diaper will be readily accessible to the consumer, as is often desired.

When the embodiment of FIGS. 3 and 4 is used, the arrays of diapers can be presented to the packaging apparatus in alternating orientations (nose leading and nose trailing). If two arrays are being deposited into one bag during the packaging operations, the manufacturer will thus have the option of producing a bag having the nose portions of the diapers positioned against top and bottom portions 46 and 47 of the bag, as shown in FIG. 7. In this configuration, a much tighter seal may be accomplished using sealing strip 49, since nose-portions 11 of the diapers of each array will be less likely to collapse under the pressure applied to the walls of the bag during the bag sealing operation. This will allow more diapers to be packaged into a given bag size, and will also provide a more rigid package of diapers. The packages of diapers shown in FIGS. 5–7 are typically loaded onto pallets for shipment and transportation to retailers. The bags are usually stacked on the pallets such that top portion 46 is facing upwardly. When the diapers are packaged in the manner shown in FIG. 7 with the nose-portions facing outwardly towards the interior walls of top portion 46 and bottom portion 47 as shown, the packages of diapers will be able to withstand greater loads without collapsing (i.e., without resulting in "pallet droop").

The package configuration of FIG. 7 also ensures that when bottom portion 47 is sealed after the arrays of diapers have been deposited within the bag, the tail portions of the diapers will not be caught in the sealing strip 49 or other mechanism for sealing bottom portion 47 of the bag of diapers. Experience has shown that when the orientation of FIG. 6 is employed, using either the apparatus and method of FIG. 2 or those of FIG. 1 along with an array turning drum, there is a substantial risk that one or more tails of diapers will be inadvertently sealed to the bag during the bag sealing process.

Finally, the apparatus and methods of FIGS. 3 and 4 can also be used to produce a bag wherein the tail portions of the diapers of each array are positioned against top portion 46 and bottom portion 47. In other words, in this embodiment, the nose portion of each diaper will be positioned along line 50 of the package, rather than the tail portions as shown in FIG. 7. In double array packages such as that shown in FIG. 7, a line of weakness is often provided at 50, thereby allowing the consumer to tear the entire bag in half in order to gain easy access to all of the diapers therein. When the apparatus and methods of the present invention are employed to produce a package wherein the nose portions of all of the diapers are aligned along line 50, when the consumer tears apart the bag along line 50 the nose portions will be readily accessible, as is often desired.

The foregoing description of preferred embodiments is by no means exhaustive of each and every variation of the present invention which is possible, and has therefore only been presented for purposes of illustration and description. Modifications and variations in the above-described embodiments will be apparent to those skilled in the art in light of the teachings herein, and these modifications and variations are well within the scope of the present invention. For example, although the apparatus and methods of the present invention have been described using diapers, these apparatus and methods are equally applicable to adult incontinence pads as well as various other types of articles which are to be collated into arrays. Thus, it is intended that the scope of the present invention be defined by the claims appended hereto, and not by the specific embodiments shown in the drawings or described above.

What we claim is:

1. A method of forming arrays of articles, comprising:
   (a) providing a stacker having a plurality of compartments for receiving said articles, said stacker traveling along a closed loop path;
   (b) transporting a plurality of said articles along a first path to said stacker in sequential fashion;
   (c) introducing said articles into said compartments at an inlet position;
   (d) removing a first array of said articles from said stacker at a first stripping position by urging the articles from said compartment in a first stripping direction;
   (e) transporting said first array along a second path away from said stacker in a direction substantially opposite to said first stripping direction; and
   (f) repeating steps (b) through (e) for subsequent articles.

2. The method of claim 1, further comprising the step of moving said first array of said articles to a plane different than the plane of travel of said stacker prior to said step of transporting the array along a second path.

3. The method of claim 2, wherein said articles are transported along said first path in a first orientation, and the articles of said first array are transported along said second path in an orientation which is substantially the same as said first orientation.

4. The method of claim 3, wherein each of said articles has a proximal end and distal end, and wherein said articles of said first array are transported along said first and second paths in a proximal end forward orientation.

5. The method of claim 3, further comprising the steps:
   (a) removing a second array of said articles from said stacker at a second stripping location by urging the articles from said compartments in a second stripping direction;
   (b) moving said second array of articles to a plane different than the plane of rotation of said stacker;
   (c) transporting said second array along said second path away from said stacker in the same direction as said second stripping direction, wherein the articles of said second array are transported along said second path in an orientation which is substantially opposite to said first orientation of said first array; and
   (d) repeating steps a through (c) for subsequent articles.

6. The method of claim 5, wherein said first and second arrays are transported along said second path in alternating fashion, thereby providing a stream of arrays of said articles having alternating orientations.

7. The method of claim 3, wherein said stacker comprises a closed loop chain, a plurality of fingers extending radially outward from said chain, and a plurality of sprockets upon which said chain travels, and wherein said compartments comprise the region between adjacent fingers.

8. The method of claim 5, wherein said stacker comprises a closed loop chain, a plurality of fingers extending radially outward from said chain, and a plurality of sprockets upon which said chain travels, and wherein said compartments comprise the region between adjacent fingers.

9. The method of claim 3, wherein said articles are absorbent articles chosen from the group consisting of: diapers, incontinence pads, sanitary napkins and pantiliners.

10. The method of claim 5, wherein said articles are absorbent articles chosen from the group consisting of: diapers, incontinence pads, sanitary napkins and pantiliners.

11. The method of claim 3, wherein said step of urging said articles from said compartments comprises pushing said articles outwardly away from said compartments and away from the interior of the closed loop path around which said stacker travels, onto an array support.

12. An apparatus for forming arrays of articles for subsequent packaging, said apparatus comprising:
   (a) a continuous stacker having a plurality of compartments for receiving said articles, said stacker advanceable along a closed looped path;
   (b) a first conveyor for transporting a plurality of said articles along a first path into said compartments;
   (c) a first array support;
   (d) a first stripper configured for urging an array of articles from said compartments in a first stripping direction onto said array support; and
   (e) a second conveyor for transporting an array of articles from said array support in a transport direction which is substantially opposite to said first stripping direction.

13. The apparatus of claim 12, further comprising a second array support and a second stripper configured for urging an array of articles from said compartments in a second stripping direction onto said second array support, wherein said second stripping direction substantially corresponds to said transport direction.

14. The apparatus of claim 12, wherein said array support is moveable between the plane of travel of said stacker towards the plane of travel of said second conveyor.

15. The apparatus of claim 13, wherein both of said array supports are moveable between the plane of travel of said stacker towards the plane of travel of said second conveyor.

16. The apparatus of claim 14, wherein said stacker comprises a closed loop chain, a plurality of fingers extending radially outward from said chain, and a plurality of sprockets upon which said chain travels, and wherein said compartments comprise the region between adjacent fingers.

17. The apparatus of claim 15, wherein said stacker comprises a closed loop chain, a plurality of fingers extending radially outward from said chain, and a plurality of sprockets upon which said chain travels, and wherein said compartments comprise the region between adjacent fingers.

18. The apparatus of claim 16, wherein said array support is positioned outside of the closed loop path around which said stacker travels, and said stripper is positioned within the interior of said closed loop path.

19. The apparatus of claim 17, wherein said array support is positioned outside of the closed loop path around which said stacker travels, and said stripper is positioned within the interior of said closed loop path.

20. The apparatus of claim 19, wherein said first and second strippers are positioned adjacent opposite sides of said stacker.

* * * * *